US012578312B2

(12) United States Patent
Specht et al.

(10) Patent No.: US 12,578,312 B2
(45) Date of Patent: Mar. 17, 2026

(54) PARTICLE-SENSING DEVICE

(71) Applicant: The University of Warwick, Coventry (GB)

(72) Inventors: Jan Specht, Coventry (GB); Marina Cole, Coventry (GB); Siavash Esfahani, Coventry (GB); Julian Gardner, Coventry (GB)

(73) Assignee: The University of Warwick, Coventry (GB)

( * ) Notice: Subject to any disclaimer, the term of this patent is extended or adjusted under 35 U.S.C. 154(b) by 181 days.

(21) Appl. No.: 18/246,409

(22) PCT Filed: Sep. 23, 2021

(86) PCT No.: PCT/GB2021/052468
§ 371 (c)(1),
(2) Date: Mar. 23, 2023

(87) PCT Pub. No.: WO2022/064197
PCT Pub. Date: Mar. 31, 2022

(65) Prior Publication Data
US 2023/0375510 A1 Nov. 23, 2023

(30) Foreign Application Priority Data

Sep. 23, 2020 (GB) ...................................... 2015003

(51) Int. Cl.
*G01N 29/44* (2006.01)
*G01N 15/06* (2006.01)
(Continued)

(52) U.S. Cl.
CPC ..... *G01N 29/4436* (2013.01); *G01N 15/0656* (2013.01); *G01N 29/221* (2013.01);
(Continued)

(58) Field of Classification Search
None
See application file for complete search history.

(56) References Cited

U.S. PATENT DOCUMENTS

| | | | |
|---|---|---|---|
| 2007/0071652 A1 | 3/2007 | Cherng et al. | |
| 2010/0134209 A1* | 6/2010 | Gabl | G01N 29/022 |
| | | | 333/187 |

(Continued)

FOREIGN PATENT DOCUMENTS

| | | |
|---|---|---|
| CN | 109728791 A | 5/2019 |
| DE | 102017219330 A1 | 5/2019 |

(Continued)

OTHER PUBLICATIONS

IPO; Combined Search and Examination Report for GB Patent Application No. GB2015003.3 dated Jun. 21, 2021, 4 pages.
(Continued)

*Primary Examiner* — Suman K Nath
(74) *Attorney, Agent, or Firm* — NK Patent Law

(57) ABSTRACT

A device for particle sensing is disclosed. The device includes a sensor including a bulk acoustic wave resonator having a resonant frequency, an acoustic mirror arranged to support the resonator, and a heater in thermal communication with the resonator such that a resonator temperature is based on a heater temperature. The device also includes circuitry connected to the sensor. The circuitry comprises a driver configured to drive the heater with a driver signal having a constant periodic cycle, and an oscillator configured to generate an output signal indicative of the resonant frequency. The resonant frequency is modulated by the resonator temperature.

13 Claims, 12 Drawing Sheets

(51) Int. Cl.

| | |
|---|---|
| *G01N 29/22* | (2006.01) |
| *G01N 29/24* | (2006.01) |
| *G01N 29/34* | (2006.01) |
| *G01N 29/42* | (2006.01) |
| *G01N 29/48* | (2006.01) |

(52) U.S. Cl.
CPC ....... *G01N 29/2431* (2013.01); *G01N 29/343* (2013.01); *G01N 29/348* (2013.01); *G01N 29/42* (2013.01); *G01N 29/4463* (2013.01); *G01N 29/48* (2013.01)

(56) References Cited

U.S. PATENT DOCUMENTS

| | | | | |
|---|---|---|---|---|
| 2012/0184051 | A1 | 7/2012 | Nirschl | |
| 2017/0097255 | A1 | 4/2017 | Karakaya | |
| 2019/0137449 | A1 | 5/2019 | Webster | |
| 2019/0212300 | A1* | 7/2019 | Cole | G01N 29/022 |
| 2020/0386611 | A1* | 12/2020 | Gorman | G01H 9/008 |

FOREIGN PATENT DOCUMENTS

| | | |
|---|---|---|
| WO | 2008045988 A1 | 4/2008 |
| WO | 2018055414 A1 | 3/2018 |

OTHER PUBLICATIONS

ISA/EPO; International Search Report and Written Opinion for International Patent Application No. PCT/GB2021/052468 dated Dec. 21, 2021, 13 pages.

Zeng Guang et al., "Detection and Discrimination of Volatile Organic Compounds using a Single Film Bulk Acoustic Wave Resonator with Temperature Modulation as a Multiparameter Virtual Sensor Array", ACS Sensors, vol. 4, 2019, pp. 1524-1533.

WIPO; International Preliminary Report on Patentability for International Patent Application No. PCT/GB2021/052468 mailed Apr. 6, 2023, 7 pages.

CNIPA; Office Action for Corresponding Chinese Patent Application No. 202180078768.9, dated Jan. 5, 2026, 20 pages.

* cited by examiner

First circuitry 3, 3₁

Start

Apply signal to resonator          S1.1

Apply driver signal          S2.1

Generate output signal          S3.1

Sample output signal          S4.1

Determine particle
composition and/or          S5.1
concentration

End

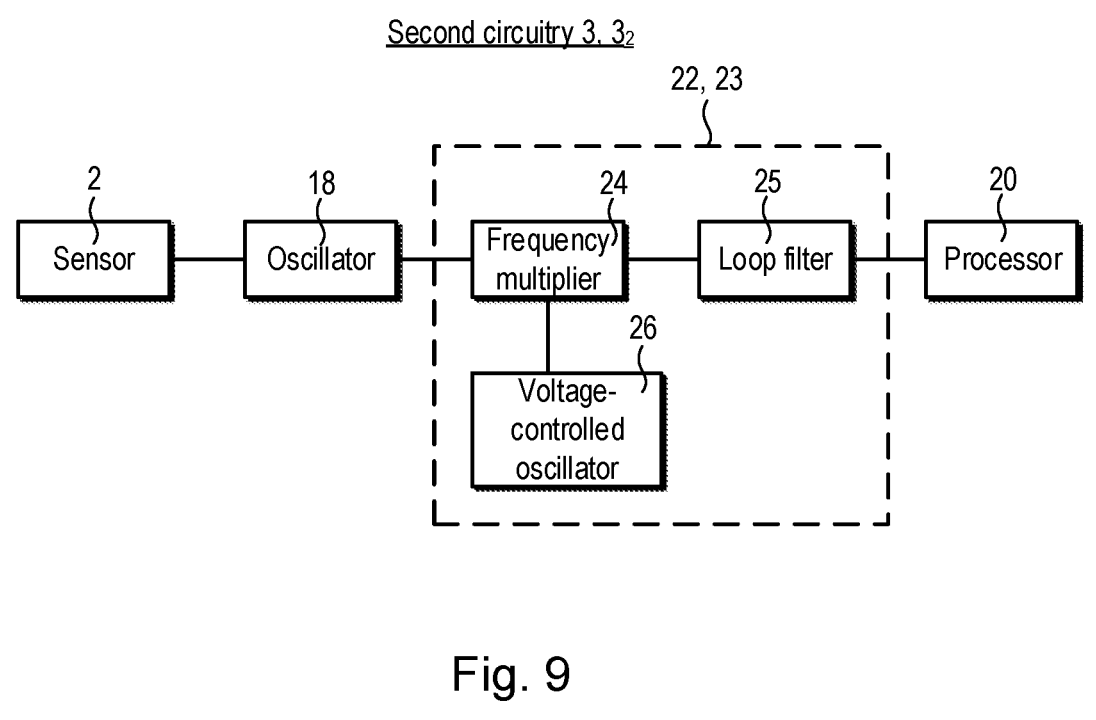

Second circuitry 3, 3₂

22, 23

| Sensor (2) | — | Oscillator (18) | — | Frequency multiplier (24) | — | Loop filter (25) | — | Processor (20) |

Voltage-controlled oscillator (26)

Fig. 9

Third circuitry 3, 3₃

Fig. 12

PARTICLE-SENSING DEVICE

Cross Reference to Related Applications

This application is a U.S. National Stage Application of International Patent Application No. PCT/GB2021/052468 filed on Sep. 23, 2021, which claims priority to United Kingdom Patent Application No. 2015003.3 filed on Sep. 23, 2020, the entire contents of all of which are incorporated by reference herein.

FIELD

The present invention relates to sensing particles, such as volatile organic compounds, dispersed in a sample, in particular using a bulk acoustic wave resonator. The present invention also relates to a method of determining particle composition and particle concentration of the sample.

BACKGROUND

Bulk acoustic wave (BAW) devices can be used to sense micrometre and sub-micrometre airborne particles. A BAW device includes a BAW resonator. BAW resonators consist of a thin layer of piezoelectric material sandwiched between two electrodes. The two electrodes are used to apply an alternating electric field to the piezoelectric layer and generate a mechanical wave in the resonator.

The resonant frequency of BAW resonators depends on, among other things, mass load. When provided in a sample, the resonant frequency of a BAW resonator may shift if particles dispersed in the sample land on the resonator surface and consequently change the mass load. A shift in resonant frequency can be detected by a frequency-sensitive circuit connected to the resonator. Thus, a BAW device can determine information relating to the sample, for example particle concentration.

Solidly mounted resonators (SMR) include a BAW resonator supported on an acoustic mirror (or "Bragg reflector"). BAW devices typically comprise an SMR.

The resonant frequency of BAW resonators also depends on changes in ambient conditions, for example temperature, pressure, and density. For example, when a BAW resonator is situated in air, variations in air humidity can affect the resonant frequency.

Without compensating for the effect of changing ambient conditions on resonant frequency, BAW devices can provide inaccurate measurements. A heater may be provided in the BAW device in order to control the device temperature, which may help to compensate for the effect of variations in device temperature on the resonant frequency.

U.S. Pat. No. 9,240,767 B2 describes an integrated resonator apparatus comprising a piezoelectric resonator, an acoustic Bragg reflector coupled to the piezoelectric resonator, and a substrate on which the acoustic Bragg reflector is disposed. The apparatus also includes an active heater layer covering the piezoelectric resonator. Heat produced by the active heater layer is controllable by an amount of current provided through the heater layer.

WO 2018/055414 A1 discloses an integrated circuit comprising a silicon substrate, a sensor comprising a bulk acoustic wave resonator and an acoustic mirror disposed between the bulk acoustic wave resonator and the substrate, and a CMOS circuit supported by substrate and operatively connected to the sensor. The circuit may further comprise a heater disposed between the acoustic mirror and the substrate. The heater may be used to modulate temperature of the sensor.

Aside from inaccurate measurements due to variations in ambient conditions, typical BAW devices can exhibit a number of other disadvantages.

Typical BAW devices provide limited information on particles within a sample, usually indicating the particle concentration only. Such devices also give rise to manufacturing variability when made in CMOS processes. Such variability can lead to difficulties in obtaining good frequency matching between two devices, which can in turn generate higher frequency output signals than desired.

Furthermore, in conventional BAW devices, there is a trade-off between device sensitivity and ease of measurement. An SMR comprised in a BAW device usually forms part of an oscillator circuit. The AC voltage frequency of such a circuit is largely determined by the resonant frequency of the resonator. The resonant frequency typically falls within the ultra-high frequency (UHF) band, which means that it is difficult to measure the AC voltage frequency of oscillator circuits, especially at low cost.

SUMMARY

According to a first aspect of the invention there is provided a device for particle sensing. The device includes a bulk acoustic wave resonator having a resonant frequency, an acoustic mirror arranged to support the resonator, and a heater in thermal communication with the resonator such that a resonator temperature is based on a heater temperature. The device also includes circuitry connected to the sensor. The circuitry comprises a driver configured to drive the heater with a driver signal having a constant periodic cycle, and an oscillator configured to generate an output signal indicative of the resonant frequency. The resonant frequency is modulated by the resonator temperature.

The device may be for sensing particles such as particulate matter in a sample or volatile organic compounds in a sample.

A particle may be an atom, a molecule, or a compound. A particle may be a single particle of particulate matter. A particle may be a discrete (or separate or single) unit of matter included in a sample of matter.

The sample may include particles of a gas, liquid, and/or solid. The sample may include atoms, compounds, and/or molecules.

Particulate matter which may be sensed by the device includes dust, soot, pollen, or other particles. Particulate matter may include a mixture of organic and inorganic particles.

The circuitry may include a processor configured to determine particle composition and/or concentration of the sample based on the output signal.

Thus, the device may help to enhance the selectivity and sensitivity of the resonator by taking into account the effect of temperature variation on resonant frequency.

In particular, the device may help to enhance the selectivity and sensitivity of the resonator to volatile organic compounds (VOC) in air.

The sensor may include a capture layer for capturing the particles, in particular volatile organic compounds.

The circuitry may further include a processor configured to determine particle composition and/or concentration of the sample based on the output signal.

The circuitry may further include a sampler configured to sample frequency of the output signal over time and to generate a sampled signal for transmitting to the processor.

The circuitry may further include a demodulator configured to compare the output signal with a reference signal and to generate a signal proportional to the difference between the output signal and a reference signal for transmitting to the processor.

The driver signal may be a periodic signal, for example a square wave signal.

According to a second aspect of the invention there is provided a method of operating the device according to the first aspect. The method includes applying the driver signal to the heater and generating the output signal.

Wherein the device is provided in a sample and comprises a processor, the method may further include the processor determining particle composition and/or concentration of the sample based on the output signal.

Determining particle composition and/or concentration may further include performing a transform on a signal received by the processor that is indicative of the output signal, and generating a frequency-domain signal based on the received signal, wherein the frequency domain signal has first and second peaks corresponding to first and second resonator temperatures respectively.

Determining particle composition may include determining a frequency shift between the first and second peaks and/or determining the amplitude of the first and second peaks.

Determining particle concentration may include determining a frequency shift between at least one of the first and second peaks and a peak corresponding to the resonant frequency of the device when the device is not provided in the sample.

The transform may be a fast Fourier transform.

Wherein the circuitry includes a sampler, the method may include the sampler sampling frequency of the output signal over time, and the sampler generating a sampled signal for transmitting to the processor.

Wherein the circuitry includes a demodulator, the method may include the demodulator comparing the output signal with a reference signal, and the demodulator generating a signal proportional to the difference between the output signal and the reference signal for transmitting to the processor.

BRIEF DESCRIPTION OF THE DRAWINGS

Certain embodiments of the present invention will now be described, by way of example, with reference to the accompanying drawings, in which:

FIG. 9 is a schematic block diagram of a second circuitry for driving the heater and generating and processing signals indicative of a resonant frequency;

FIG. 12 is a schematic block diagram of a third circuitry for driving the heater and generating and processing signals indicative of a resonant frequency.

DETAILED DESCRIPTION OF CERTAIN EMBODIMENTS

The present application is concerned with a BAW resonator-based device for determining particle concentration and/or particle composition of a sample. The BAW device generates a temperature-modulated resonant frequency signal.

Device 1 for Particle Sensing 1

Figure 1:
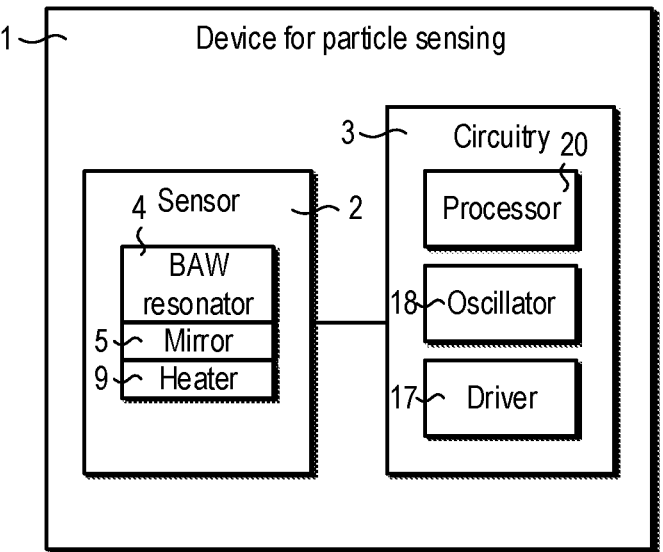
FIG. 1 is a schematic block diagram of a particle-sensing device including a sensor.

Referring to FIG. 1, a device 1 for particle sensing (herein also referred to as a "particle-sensing device" or a "BAW device") is shown.

The BAW device 1 can be used to sense or detect micrometre and sub-micrometre airborne particles dispersed in a sample (not shown), for example an air sample or a liquid sample. The BAW device 1 includes a sensor 2 for detecting the particles and circuitry 3 (herein also referred to as "readout circuitry").

Figures 2A, 2B:
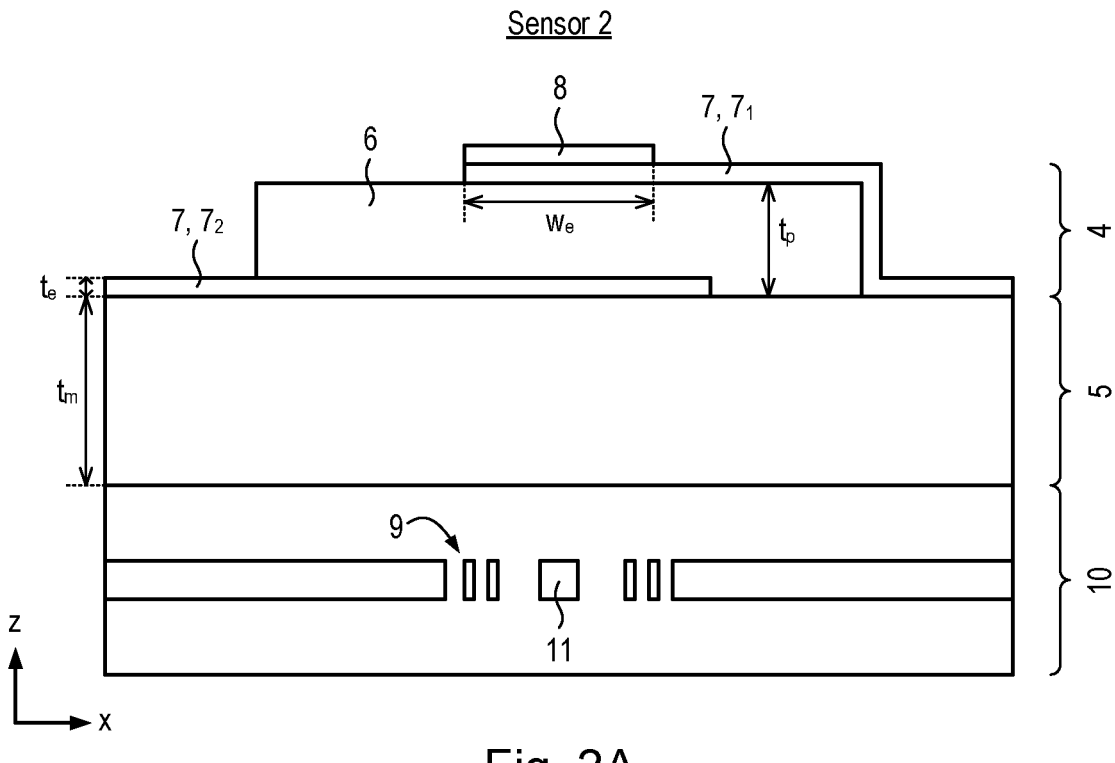
FIG. 2A is schematic side view of the sensor shown in FIG. 1, the sensor including a heater and a temperature sensor.
FIG. 2B is a schematic plan view of the heater and temperature sensor shown in FIG. 2A.

Referring also to FIG. 2A, the sensor 2 includes a BAW resonator 4 having a resonant frequency and an acoustic mirror 5 on which the BAW resonator 4 is supported. The circuitry 3 is for generating and processing signals indicative of the resonant frequency. The BAW resonator 4 and the acoustic mirror 5 form a solidly mounted resonator.

The BAW resonator 4 consists of a layer 6 of piezoelectric material (herein also referred to as "piezoelectric material layer 6") sandwiched between first and second electrodes 7, $7_1$, $7_2$. The piezoelectric material may be zinc oxide (ZnO), aluminium nitride (AlN), or any other suitable piezoelectric material. The layer 6 of piezoelectric material may have a thickness, $t_p$, of between 1 and 3 μm (thickness direction lies along z axis). Each electrode 7 may comprise aluminium (Al) and may have a thickness, $t_e$, of between 100 and 400 nm.

The acoustic mirror 5 provides the BAW resonator 4 with at least partial acoustic isolation so as to confine or more efficiently confine the acoustic energy generated by the resonator. The acoustic mirror 5 includes a stack of high and low acoustic impedance materials which may be, for example, alternating metal and dielectric layers. The acoustic mirror 5 may comprise complementary metal-oxide-semiconductor (CMOS) process compatible materials, such as tungsten (W) and silicon dioxide ($SiO_2$). The acoustic mirror 5 may have a thickness, $t_m$, of between 1 and 4 μm. The acoustic mirror 5 may include between 3 and 10 layers of acoustic impedance materials.

The second electrode $7_2$ may not extend along a complete length of the piezoelectric material layer 6. The piezoelectric material layer 6 may be partially provided or in contact with the acoustic mirror 5. The first electrode $7_1$ may not extend along a complete length of the piezoelectric material layer 6. The first electrode $7_1$ may extend onto the acoustic mirror 5. Each electrode 7 may have a shape defined by the process capabilities of the device 1. The first and second electrodes $7_1$, $7_2$ overlap. The first and second electrodes $7_1$, $7_2$ may overlap by a width, $w_e$, of 200 μm for example (width direction is along the x axis). The extent of overlap between the first and second electrodes $7_1$, $7_2$ may depend on the size of the area over which particles are captured and sensed by the device 1 ("active area").

The sensor 2 may also include a capture layer 8 provided on the first electrode $7_1$. The capture layer 8 is for capturing analytes (not shown), such as airborne micrometre or sub-micrometre sized particles, or particles such as particulate matter. Examples of analytes suitable for capture by the capture layer 8 include volatile organic compounds (VOC), such as formaldehyde, toluene, octane, acetone or benzynes. Other examples include biological compounds, such as DNA or enzymes. The capture layer 8 maybe coated with a suitable receptor (not shown) for binding to specific analytes. The area of the capture layer 8 for capturing analytes is the active area. The sensor 2 may not include the capture layer 8 and the analytes may be directly deposited on a surface of the BAW resonator 4. Thus, a surface of the BAW resonator 4 may act as the active area.

The sensor 2 may include a passivation layer (not shown) provided between the first electrode $7_1$ and the capture layer 8. The passivation layer is for avoiding corrosion of the electrode $7_1$. The passivation layer may be formed of a nitride or an oxynitride.

The sensor 2 further includes a heater 9 having a heater temperature. The heater 9 is arranged so as to be in thermal communication with at least the BAW resonator 4. Thus, the heater 9 can control the temperature of the BAW resonator 4 (herein also referred to as "resonator temperature") such that the resonator temperature is based on or influenced by the heater temperature. The BAW device 1 may include a substrate 10 and the heater 9 may be provided between the acoustic mirror 5 and a substrate 10. The heater 9 may be integrated into the substrate 10.

The BAW device 1 includes a temperature sensor 11 for measuring the heater temperature. A temperature control circuit (not shown) is included in the circuitry 3 and connected to the temperature sensor 11 for controlling the heater temperature. The temperature sensor 11 is arranged in close proximity to the heater 9 so as to measure the heater temperature. The temperature sensor 11 may be provided between the acoustic mirror 5 and the substrate 10.

Referring to FIG. 2B, the heater 9 is shown in greater detail. The heater 9 may include a heater loop 16, for example a three-turn loop. The heater loop 16 is primarily responsible for heat conduction to the BAW resonator 4. The heater loop 16 lies in a plane substantially normal to a thickness direction of the BAW device 1. The heater loop 16 may have a diameter, $d_h$, of 150 μm. The diameter, $d_h$, may depend on the size of the active area. The diameter, $d_h$, may be the same length as the active area. A pair of metal tracks

12 are connected to ends of the loop 16. The tacks 12 may each run outwardly is away from the loop 16 along the plane. The tracks 12 may run in opposite directions. The tracks 12 are connected to the temperature control circuit (not shown).

The temperature sensor 11 may lie inside the heater loop 16. The temperature sensor 11 may be provided by an interface 13 between a patterned layer 14 of highly-doped n-type silicon (i.e. n+ silicon) and a patterned layer 15 of highly-doped p-type silicon (i.e. p+ silicon). The temperature sensor 12 may be a metal or CMOS layer.

The acoustic mirror 5, heater 9, temperature sensor 11 and circuitry 3 may form part of layers (not shown) defined by standard CMOS fabrication processes ("CMOS process-defined layers"). The design parameters of each of the acoustic mirror 5, heater 9, temperature sensor 11 and circuitry 3 may be determined by the CMOS fabrication processes used. Reference is made to WO2018/055414 A1, which describes an acoustic mirror, heater, temperature sensor and circuitry in CMOS process-defined layers in a BAW resonator-based device The heater 9 is driven by a current signal having a constant periodic cycle (herein also referred to as a "driver signal"). The driver signal is provided to the heater 9 by a driver 17 which forms part of the circuitry 3. The heater 9 may be driven by a square wave (pulsed) signal. The heater 9 may be driven by a signal such that the heater 9 turns on and off periodically.

Figure 3A:
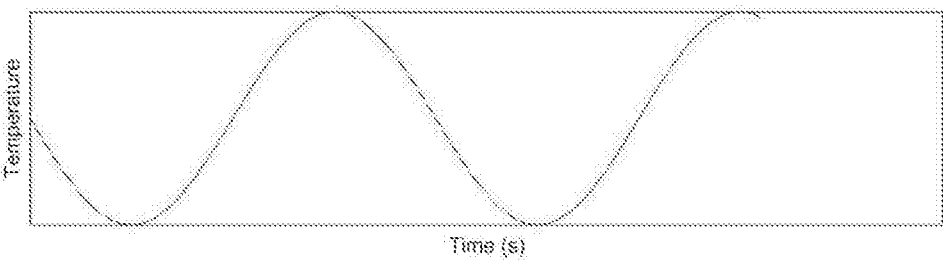
FIG. 3A is a plot of heater temperature against time.

Referring also to FIG. 3A, an example of a temperature profile of the heater 9 being driven by the driver signal is shown.

The resonator temperature follows a periodic cycle due to heating by the heater 9. The resonator temperature varies between a maximum temperature and a minimum temperature. The temperature control circuit (not shown) controls the minimum and maximum temperature of the heater 9 based on measurements taken by the temperature sensor 11. Both the minimum and maximum temperatures of the BAW resonator 4 are higher than an ambient temperature of the BAW device 1. Thus, the temperature senor 11 and temperature control circuit are for ensuring that the heater 9 heats the sensor 2 above an ambient temperature. Use of the heater 9 to control resonator temperature may help to reduce, or even prevent, ambient temperature affecting the resonant frequency of the BAW resonator 4.

The BAW resonator 4 is sensitive to changes in ambient conditions. Thus, the BAW resonator 4 and the acoustic mirror which supports the resonator 4 acts as an amplifier to the changes in heater temperature due to the driver signal. The measurement of the heater temperature on its own has limited accuracy and limited resolution.

The resonator temperature is affected by heat loss through the surface of the BAW device 1. The heat loss of the BAW device 1 is altered when analytes are captured by the capture layer 8. For example, a partition coefficient of a receptor (not shown), if present, will change due to analyte capture, leading to heat loss. Thus, as analytes are captured, the maximum and minimum temperatures of the resonator temperature are also altered.

As hereinbefore explained, variation in resonator temperature can cause a shift in resonant frequency of the BAW resonator 4. Thus, a shift in resonant frequency is dependent on both analyte capture (mass load) and resonator temperature, which is further dependent on analyte capture.

In a situation in which the ambient conditions and the mass load of the BAW device 1 are kept constant ("a static state"), the resonant frequency of the BAW resonator 4 is also constant.

Figure 3B:
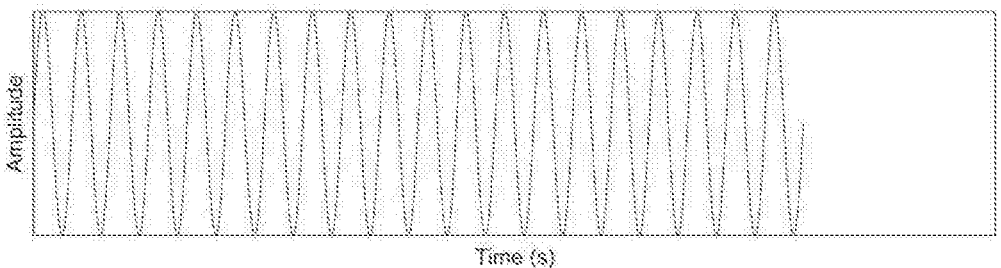
FIG. 3B is a plot showing resonant frequency of the device shown in FIG. 1 when ambient conditions and mass load are kept constant.

Referring also to FIG. 3B, an example plot showing resonant frequency for a BAW device 1 in the static state is shown. The resonant frequency is constant in the static state.

When the heater 9 is driven by the driver signal, the resonator temperature follows a periodic cycle as hereinbefore described. This periodic cycle affects the resonant frequency. In other words, when the heater 9 is driven by the driver signal, the resonant frequency is modulated by the resonator temperature.

Figure 3C:
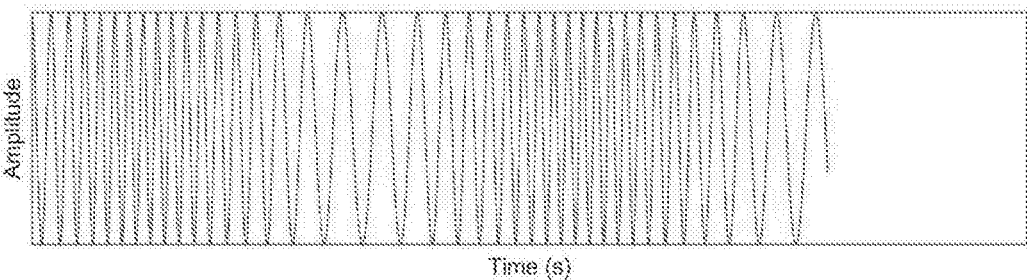
FIG. 3C is a plot showing temperature-modulated resonant frequency of the device shown in FIG. 1.

Referring also to FIG. 3C, an example plot (not to scale) showing the resonant frequency of the BAW resonator 1 cycling between a maximum frequency and a minimum frequency is shown. The effect of resonator temperature on resonant frequency is analogous to a carrier signal being frequency-modulated.

Figure 4:
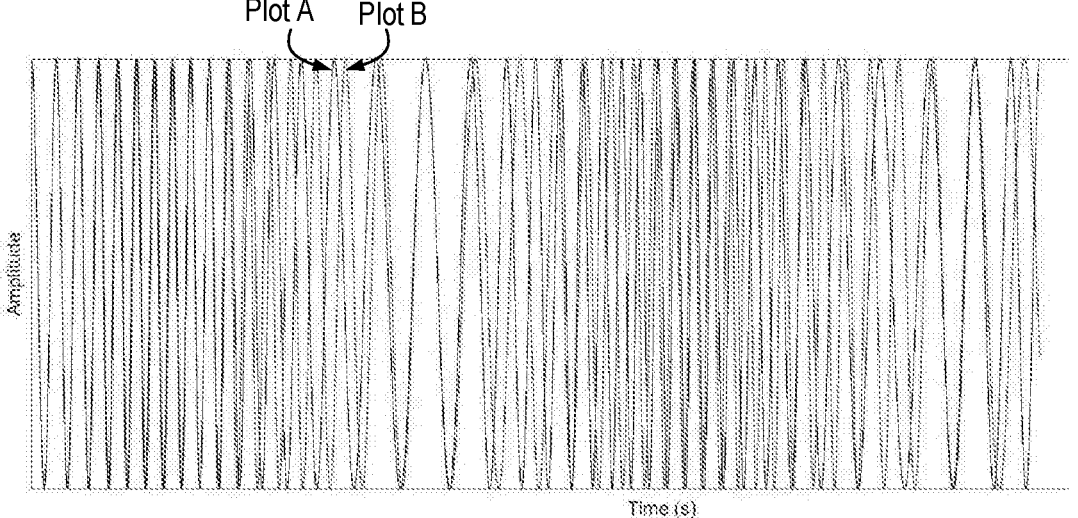
FIG. 4 shows behaviour of temperature-modulated resonant frequency of the device is shown in FIG. 1 for different mass loads.

When the BAW device 1 is provided in a sample, analyte capture occurs at the capture layer 8 over a given period from a first time to a second time. The increase in mass load over the given period causes a shift in resonant frequency across the whole frequency spectrum. However, a further frequency shift occurs due to a change in resonator temperature (due to the thermal loss of the BAW device 1). The frequency shift due to the combination of mass load change and resonator temperature change when the heater 9 is being driven by the driver signal is shown in FIG. 4. Plot A corresponds to the resonant frequency at the first time (less mass load) and plot B corresponds to the resonant frequency at the second time (greater mass load). The difference between plot A and plot B shows how the periodic cycle of resonant frequency is altered as a result of change in mass load.

The way in which the circuitry 3 processes signals indicative of the resonant frequency enhances the selectivity and sensitivity of the device 1. The sensitivity of the device 1 may be improved by improving the signal-to-noise ratio (noise performance) of the device 1, for example by reducing the effects of ambient conditions such as humidity and airflow. Another resonator (not shown) may be used as a reference to help compensate for ambient conditions. This will now be explained with reference to a number of example circuitries 3.

Readout Circuitry 3

Figure 5:
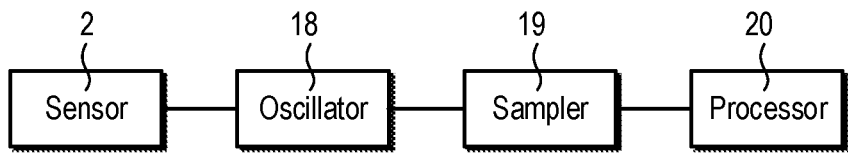
FIG. 5 is a schematic block diagram of a first circuitry for driving the heater and generating and processing signals indicative of a resonant frequency.

Referring also to FIG. 5, a block diagram of first circuitry 3, 3$_1$ for driving the heater 9 and generating and processing signals indicative of the resonant frequency is shown. The first circuitry 3$_1$ includes the driver 17 (FIG. 1) and the first circuitry 3$_1$ is connected to the sensor 2.

The first circuitry 3$_1$ includes an oscillator 18 connected to the first and second electrodes 7$_1$, 7$_2$. The oscillator 18 is for driving the BAW resonator 4 and for generating signals indicative of the resonant frequency of the resonator 4. Thus, the oscillator 18 outputs a signal indicative of the temperature-modulated resonant frequency ("temperature-modulated resonant frequency signal"). The oscillator 18 may be a Colpitts or Pierce oscillator, or a simple RF amplifier (not shown).

Figure 6:
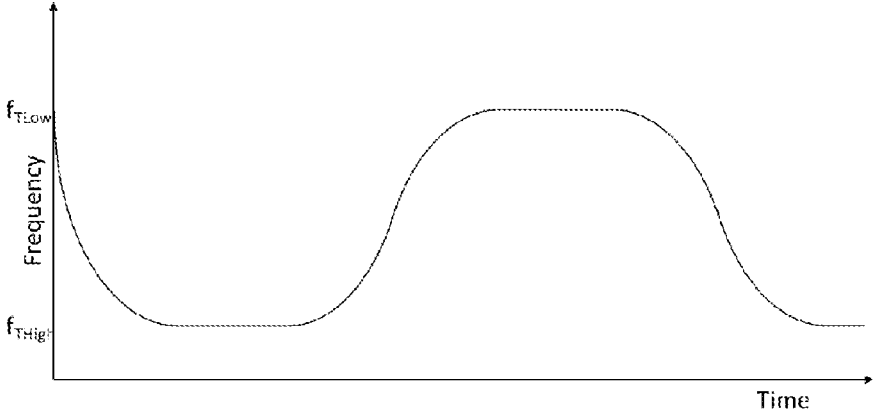
FIG. 6 is a plot of temperature-modulated resonant frequency against time for the device shown in FIG. 1.

The first circuitry 3$_1$ also includes a sampler 19 connected to the oscillator 18 and a processor 20 connected to the sampler 19. The sampler 19 is for sampling the signal received from the oscillator 18 over time. The sampler 19 generates a signal which is indicative of the resonant frequency (herein also referred to as a "sampled signal"), but is of a much lower frequency. FIG. 6 shows an example plot of the sampled signal. The sampled signal periodically cycles between a maximum frequency and a minimum frequency over time. These frequency values correspond to the maximum and minimum resonant frequency values through which the BAW resonator 4 cycles as a result of the temperature modulation of the heater 9.

Use of the sampler 19 in the first circuitry 3$_1$ may help to address the trade-off encountered in conventional BAW resonator-based devices between device sensitivity and ease of measurement. In particular, the circuitry 3 in the BAW device 1 has higher sensitivity compared to conventional readout circuits but generates low frequency signals appropriate for low-cost measurement instrumentation such as the processor 20.

The processor 20 is for receiving and analysing the sampled signal in order to determine particle composition and/or particle concentration, as will be explained in more detail hereinafter. Particle concentration is herein also referred to as "particle mass concentration". The particle mass concentration may be the particle mass per unit area of the active area of the device 1. The particle mass concentration may be the particle mass per unit volume of the sample. A measurement of the mass per unit volume may be derived from a measurement of the mass per unit area.

Figure 7:
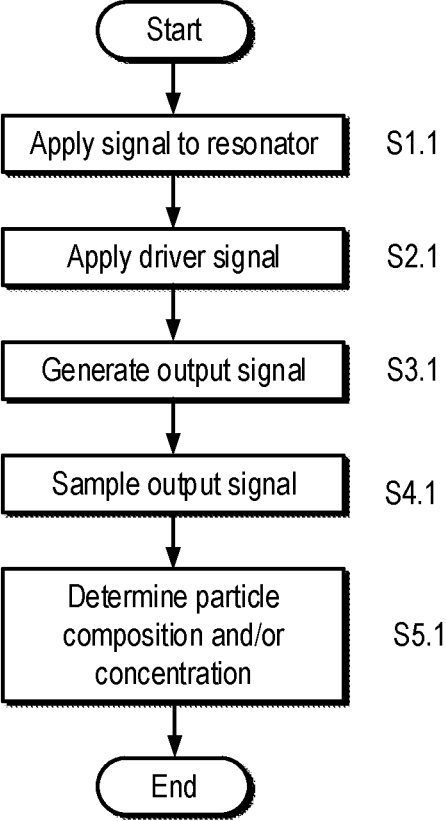
FIG. 7 is a process flow diagram of a first method of operating a particle-sensing device comprising the first circuitry shown in FIG. 6.

Referring also to FIG. 7, a first method of operating the BAW device 1 including the first circuitry 3$_1$ will now be described.

In order to instigate resonance within the BAW resonator 4, the oscillator 18 drives the BAW resonator 4 such that an alternating electric field is applied across the layer of piezoelectric material layer 6 (step S1.1). The BAW resonator 4 begins to resonate at a constant frequency.

The driver 17 then applies the driver signal to the heater 9. The resonant frequency becomes modulated by the periodic variation in resonator temperature (step S2.1).

The oscillator 18 generates the temperature-modulated resonant frequency signal (step S3.1). The sampler 19 samples the frequency of this signal over time (step S4.1) to generate the sampled signal.

After receiving the sampled signal, the processor 20 determines particle composition and/or concentration of the sample (step S5.1).

The BAW device 1 may be provided in the sample before step S1.1. The temperature-modulated resonant frequency signal corresponding to the BAW resonator 4 without analyte capture is generated by operating the BAW device 1 according to steps S1.1 to S3.1 without providing the BAW device 1 in the sample.

Figure 8:
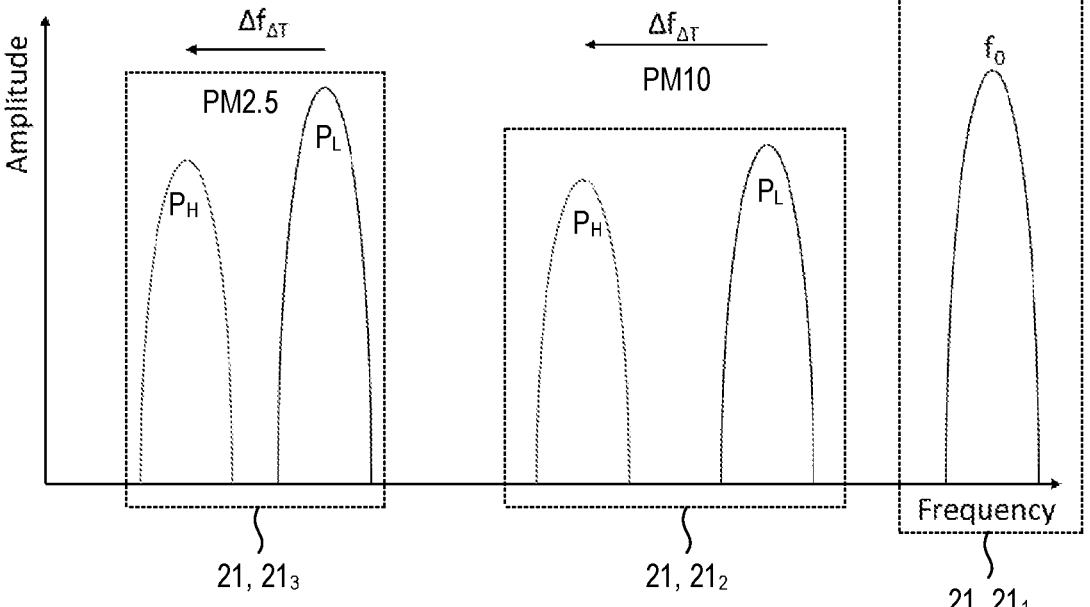
FIG. 8 shows three plots of frequency-domain signals corresponding to resonant frequency signals for the device shown in FIG. 1.

In order to determine particle composition and/or concentration, the processor 20 applies or performs a transform on the sampled signal to generate a frequency-domain signal (herein also referred to as a "transformed signal"). The transform may be a fast Fourier transform. As will now be described with reference to FIG. 8, information regarding particle composition and/or concentration can be extracted from a transformed signal or through a comparison of signals in the frequency-domain FIG. 8 shows three sets of data plots 21, 21$_1$, 21$_2$, 21$_3$, each data plot 21 including at least one amplitude peak against frequency. Each data plot 21 corresponds to a different amount of mass load or analyte capture of the BAW device 1. Thus, each data plot 21 may correspond to a particular point in time over a given period of analyte capture. The second and third data plots 21$_2$, 21$_3$ may correspond to different samples having different particle diameters. For example, the second data plot 21$_2$ may correspond to a sample of particulate matter having particle diameter of 10 μm or less (labelled "PM10" in FIG. 8) and the third data plot 21$_3$ may correspond to a sample of particulate matter having particle diameter of 2.5 μm or less (labelled "PM2.5" in FIG. 8).

The first data plot $21_1$ includes a single peak and corresponds to the resonant frequency, $f_o$, of the BAW device 1 provided outside of the sample (i.e. without any analyte capture). The first data plot $21_1$ was captured without temperature modulation of the frequency.

The second data plot $21_2$ includes two peaks. The two peaks consist of a high temperature peak, $P_H$, and a low temperature peak, $P_L$. As hereinbefore described, the resonator temperature varies between a maximum temperature and a minimum temperature due to the periodic cycle of the driver signal. The $P_H$ peak corresponds to the value of resonant frequency (the minimum frequency) at maximum resonator temperature. The $P_L$ peak corresponds to the value of resonant frequency (the maximum frequency) at minimum resonator temperature.

The third data plot $21_3$ is similar to the second data plot $21_2$. However, the third data plot $21_3$ corresponds to a different amount of mass load of the BAW device 1 compared to the second data plot $21_2$. Thus, there is an overall shift in frequency between the peaks in the second data plot $21_2$ and the peaks in the third data plot $21_3$. The second and third data plots $21_2$, $21_3$ may correspond to separate frequency measurements taken by the same BAW device 1 over a given period of time in which analytes have accrued on the device 1, for example on the capture layer 8.

The processor 20 is configured to determine information such as particle concentration and particle mass based on certain frequency shifts between peaks. For example, the frequency shift between the peak in the first data plot $21_1$ and at least one peak in, for example, the second data plot $21_2$ indicates particle mass concentration, for example VOC mass concentration.

The device 1 may be provided in a sample of known concentration and the frequency shift between the first data plot $21_1$ and one of the other data plots $21_2$, $21_3$ can be determined for this known concentration. The frequency shift between the first data plot $21_1$ and, for example, the $P_L$ peak in the second data plot $21_2$ for a sample of unknown concentration can be compared with the frequency shift between these same peaks for a sample of known concentration. In this way, the particle concentration of the sample under measurement can be inferred based on the frequency shift between the peak in the first data plot $21_1$ and at least one peak in, for example, the second data plot $21_2$.

The frequency shift, $\Delta f_{AT}$, between two peaks within a data plot 21 indicates both the particle concentration and the type of particle in the sample ("particle composition"). The type of particle may be indicated by the diameter of the particle, e.g. a sample having PM10 or PM2.5. The amplitude of the peaks $P_L$, $P_H$ also indicates particle concentration and composition. For a given data plot, for example the second data plot $21_2$, particle composition of the sample corresponding to this data plot $21_2$ may be determined as hereinbefore described. The type of particle in this sample can then be inferred by comparing $\Delta f_{AT}$ and/or peak amplitude of the second data plot $21_2$ with $\Delta f_{AT}$ and/or peak amplitude of another data plot of known particle concentration and composition. Thus, the processing performed by the circuitry 3 may help to extract more detailed information regarding the sample, such as particle composition.

Referring also to FIG. 9, a block diagram of second circuitry 3, $3_2$ for driving the heater 9 and generating and processing signals indicative of the resonant frequency is shown. The second circuitry $3_2$ is connected to the sensor 2.

The second circuitry $3_2$ is similar to the first circuitry $3_1$ (FIG. 5). However, in place of the sampler 19, the second circuitry $3_2$ comprises a demodulator 22. The demodulator 22 provides a demodulated signal to the processor 20.

The demodulator 22 may be a quadrature detector (not shown) or a phase-locked loop 23 (FIG. 9). In this case, the demodulator 22 is a phase-locked loop and comprises a frequency multiplier 24 for receiving the signal indicative of the resonant frequency from the oscillator 18.

The demodulator 22 further includes a loop filter 25 connected to the frequency multiplier 24. The output of the loop filter 25 is jointly electrically connected to a voltage-controlled oscillator 26 and the processor 20. The output of the voltage-controlled oscillator 26 is connected to the frequency multiplier 24. Thus, the frequency multiplier 24 is for receiving both an input from the oscillator 18 (herein also referred to as "first input signal") and an input from the voltage-controlled oscillator 26 (herein also referred to as a "second input signal").

The frequency multiplier 24 is configured to output a signal proportional to the difference between the first and second input signals. Thus, the signal output by the frequency multiplier 24 varies with the cycle of resonant frequency shown in the temperature-modulated resonant frequency signals. The loop filter 25 is for removing or filtering out harmonics of the signal output by the frequency multiplier 24 falling into particular frequency bands. Thus, the signal provided to the processor 20 (herein is also referred to as the "filtered signal") falls into a frequency band significantly lower than the temperature-modulated resonant frequency signal. In this way, the use of the phase-locked loop 23 in the second circuitry $3_2$ may help the processor 20 to perform simpler and more cost-effective measurements.

Figure 10:
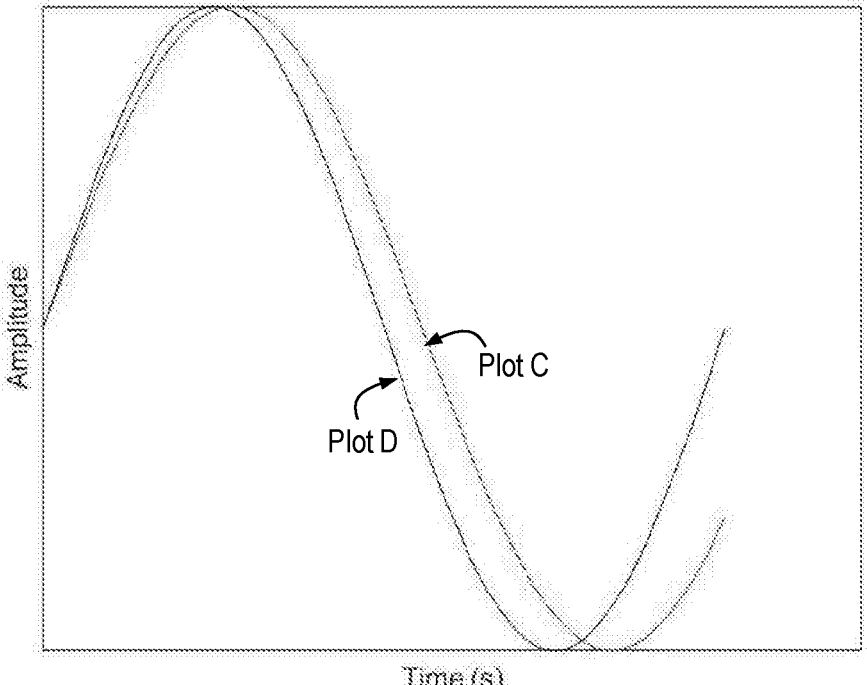
FIG. 10 shows temperature-modulated resonant frequency signal for the device comprising the second circuitry shown in FIG. 9 for different mass loads.

FIG. 10 shows a plot of the signal output by the loop filter 25 (herein also referred to as "plot C"), which is for transmitting to the processor 20. FIG. 10 also shows a plot of the same signal, but correspond to a BAW device 1 not provided in a sample (herein also referred to as "plot D"). FIG. 10 shows a frequency shift between plot C and plot D. The shift is caused by a change in mass load of the BAW device 1 between the generation of the signal shown by plot C and the signal shown by plot D. The processor determines information relating to particle composition and/or concentration based on this frequency shift in a similar way as hereinbefore described.

Aside from the processor 20, the voltage-controlled oscillator 26 also receives the signal output by the loop filter 25. The voltage-controlled oscillator 26 is for generating the second input signal based on the voltage level of the signal output by the loop filter 25. Thus, the second input signal corresponds to a carrier signal (i.e. the resonant frequency signal without the effect of temperature modulation). The second input signal acts as a reference signal to the first input signal.

Figure 11:
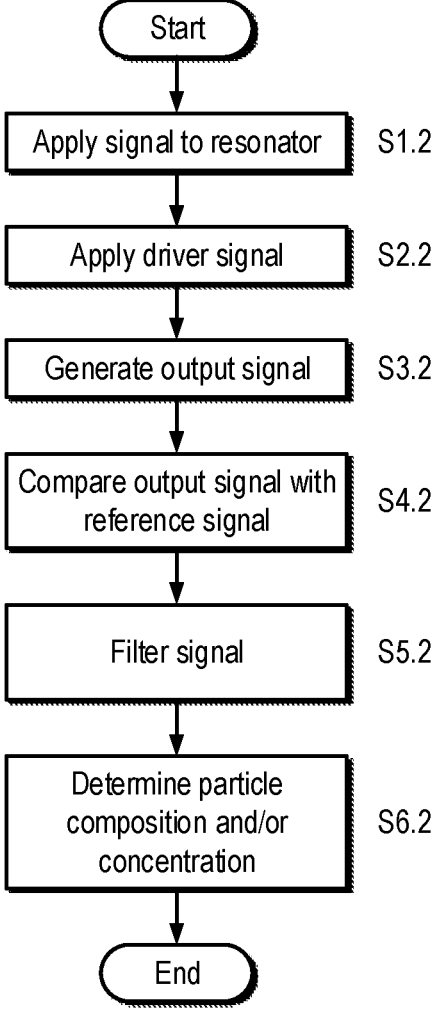
FIG. 11 is a process flow diagram of a second method of operating a particle-sensing device comprising the second circuitry shown in FIG. 9.

Referring also to FIG. 11, a second method of operating the BAW device 1 including the second circuitry $3_2$ will now be described.

The steps S1.2 to S3.2 of the second method are the same as steps S1.1 to S3.1 of the first method hereinbefore described.

The signal indicative of the temperature-modulated resonant frequency generated in step S3.2 is provided to the frequency multiplier 24 as the first input signal. The frequency multiplier 24 compares the first input signal and the second input signal to generate a signal proportional to the difference between the first and second signals (step S4.2).

After the temperature-modulated resonant frequency signal is first generated, the second input signal is negligible because an initial signal has not yet been generated by the loop filter 25 and provided to the voltage-controlled oscillator 26.

The signal output by the frequency multiplier 24 is provided to the loop filter 25, which filters or removes harmonics falling into certain frequency bands (step S5.2), preferably higher frequency bands such as the UHF band.

The filtered signal is provided to the processor 20. The processor 20 performs analysis on the filtered signal as hereinbefore described (step S6.2).

Figure 12:
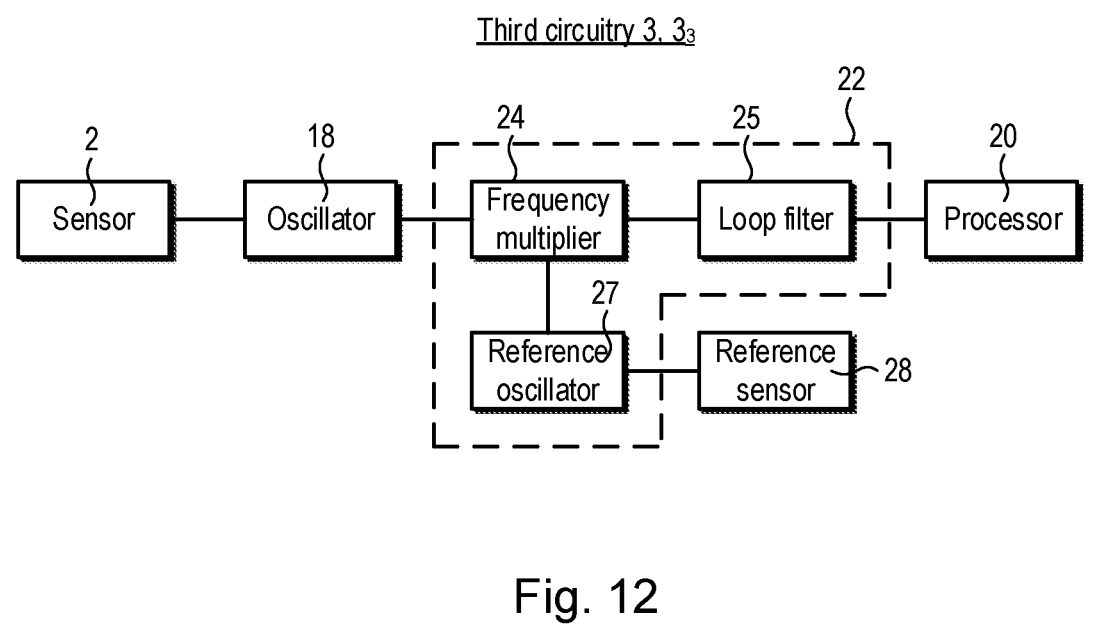

Referring also to FIG. 12, a block diagram of third circuitry 3, 3₃ for driving the heater 9 and generating and processing signals indicative of the resonant frequency is shown. The third circuitry 3₃ is connected to the sensor 2.

The third circuitry 3₃ is the same as the second circuitry 3₂ (FIG. 9). However, instead of a voltage-controlled oscillator 26, the third circuitry 33 includes a reference oscillator 27. A reference sensor 28 is connected to the reference oscillator 27. The signal output by the loop filter 25 is provided to the processor 20 only. According to the third circuitry 3₃, the demodulator 22 includes the frequency multiplier 24, the loop filter 25, and the reference oscillator 27.

The reference sensor 28 includes a BAW resonator (not shown). The reference sensor 28 is the same as the sensor 2 hereinbefore described. However, the resonant frequency of the BAW resonator included in the reference sensor 28 is not modulated by a resonator temperature.

The reference oscillator 27 is the same as the oscillator 18 hereinbefore described. The reference oscillator 27 is configured to generate a signal indicative of the resonant frequency of the BAW resonator included in the reference sensor 28. The reference oscillator 27 transmits this signal to the frequency multiplier 24. Thus, according to the third circuitry 3₂, the signal transmitted by the reference sensor 27 corresponds to the second input signal of the frequency multiplier 24.

In a similar way to the second circuitry 3₂, the second input signal generated by the third circuitry 3₃ acts as a reference signal to the first input signal. In particular, use of the reference oscillator 27 can help to remove noise from the temperature-modulated resonant frequency signal output by the oscillator 18. The noise may be due to air flow fluctuations, humidity, or other variations in ambient conditions. For example, subjecting the reference sensor 28 to the same ambient conditions as the sensor 2 can help the reference oscillator 27 to provide a compensating effect. This is because the change in resonant frequency due to ambient conditions in the first and second input signals will be the same or similar. This change in resonant frequency will not be indicated in the signal output by the frequency multiplier 24 due to the differential nature of this output signal. Thus, the effect of ambient conditions can compensated through use of the reference oscillator 27.

Figure 13:
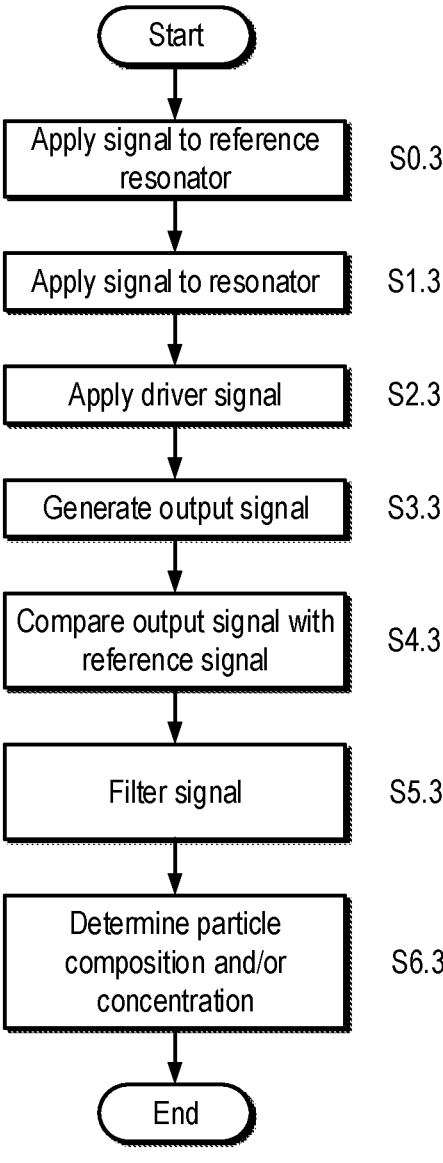
FIG. 13 is a process flow diagram of a third method of operating a particle-sensing device comprising the third circuitry shown in FIG. 12.

Referring also to FIG. 13, a third method of operating the BAW device 1 including the third circuitry 3₃ will now be described.

Steps S1.3 to S6.3 of the third method are the same as stets S1.2 to S6.2 of the second method. However, the third method also includes the reference oscillator 27 driving the BAW resonator (not shown) included in the reference sensor 28 such that the BAW resonator resonates (step S0.3). Step S0.3 may occur before step S1.3. Step S0.3 may occur at any point in time before step S4.3.

The sensor 2 and the reference sensor 27 are both provided in the same sample when operating the BAW device 1 according to the third method.

In another example of the BAW device 1 including the third circuitry 3₃, the resonant frequency of the BAW resonator is not modulated by resonator temperature.

In another example, the reference sensor 28 is modulated by a resonator temperature in the same way as hereinbefore described.

Use of the third circuitry 3₃ in the BAW device 1 may help improve the resistance of the signal provided to the processor 20 to noise effects, such as changes in humidity and/or temperature.

Furthermore, use of the third circuitry 3₃ may help to address the problem of poor frequency matching between BAW resonator-based devices. In conventional readout circuitry, the generated readout signal is indicative of the raw difference between the frequencies of two devices. This raw difference is often large due to manufacturing variabilities of the devices, which results in a high frequency readout signal. The frequency multiplier 24 of the third circuitry 33 generates a signal which is proportional to the difference between the first and second input signals, which may help prevent a high frequency readout signal.

The invention claimed is:

1. A device for sensing particles in a sample, the device comprising:
   a sensor comprising:
      a bulk acoustic wave resonator having a resonant frequency;
      an acoustic mirror arranged to support the resonator; and
      a heater in thermal communication with the resonator such that a resonator temperature is based on a heater temperature;
   circuitry connected to the sensor, wherein the circuitry comprises:
      a driver configured to drive the heater with a driver signal having a constant periodic cycle;
      an oscillator configured to generate an output signal indicative of the resonant frequency, wherein the resonant frequency is modulated by the resonator temperature such that the resonant frequency has a periodic cycle; and
      a processor configured to determine particle composition and/or concentration of the sample based on the output signal, wherein the determination involves considering a change in the periodic cycle of the resonant frequency.

2. The device according to claim 1, wherein the device is for sensing particles such as volatile organic compounds in the sample or particulate matter in the sample.

3. The device according to claim 2, the circuitry further comprising:
   a sampler configured to sample frequency of the output signal over time and to generate a sampled signal for transmitting to the processor.

4. The device according to claim 2, the circuitry further comprising:
   a demodulator configured to compare the output signal with a reference signal and to generate a signal proportional to the difference between the output signal and a reference signal for transmitting to the processor.

5. The device according to claim 1, wherein the driver signal is a periodic signal, for example a square wave signal.

6. A method of operating the device according to claim 1, wherein the method comprises:
   applying the driver signal to the heater;
   generating the output signal.

7. The method according to claim 6, wherein the device is provided in the sample and the method comprises:

the processor determining particle composition and/or concentration of the sample based on the output signal.

8. The method according to claim 7, wherein determining particle composition and/or concentration comprises:

performing a transform on a signal received by the processor that is indicative of the output signal;

generating a frequency-domain signal based on the received signal, wherein the frequency domain signal has first and second peaks corresponding to first and second resonator temperatures respectively.

9. The method according to claim 8, wherein determining particle composition further comprises:

determining a frequency shift between the first and second peaks, and/or;

determining the amplitude of the first and second peaks.

10. The method according to claim 8, wherein determining particle concentration further comprises:

determining a frequency shift between at least one of the first and second peaks and a peak corresponding to the resonant frequency of the device when the device is not provided in the sample.

11. The method according to claim 8, wherein the transform is a fast Fourier transform.

12. The method according to claim 6, wherein the circuitry comprises a sampler and the method comprises:

the sampler sampling frequency of the output signal over time; and the sampler generating a sampled signal for transmitting to the processor.

13. The method according to claim 6, wherein the circuitry comprises a demodulator and the method comprises:

the demodulator comparing the output signal with a reference signal; and the demodulator generating a signal proportional to the difference between the output signal and the reference signal for transmitting to the processor.

\* \* \* \* \*